(12) United States Patent
Okamoto et al.

(10) Patent No.: US 6,894,437 B2
(45) Date of Patent: May 17, 2005

(54) LIGHT SOURCE DEVICE

(75) Inventors: Masashi Okamoto, Akashi (JP); Toshio Yokota, Ebina (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/303,839

(22) Filed: Nov. 26, 2002

(65) Prior Publication Data

US 2003/0098659 A1 May 29, 2003

(30) Foreign Application Priority Data

Nov. 26, 2001 (JP) ........................ 2001-359961

(51) Int. Cl.[7] ............................................. H05B 37/00
(52) U.S. Cl. .................... 315/209 R; 315/291; 315/247
(58) Field of Search ............................... 315/219, 224, 315/291, 247, 307, 308, 289, 209 R, 290, 158, 205

(56) References Cited

U.S. PATENT DOCUMENTS 3,662,216 A * 5/1972 Hildebrant .................. 315/205
3,890,537 A   6/1975 Park et al.
4,346,331 A * 8/1982 Hoge ......................... 315/158
4,705,991 A * 11/1987 Ganser et al. .......... 315/209 R
5,059,869 A   10/1991 Albach et al.
5,859,505 A   1/1999 Bergman et al.
6,323,603 B1 * 11/2001 Persson ...................... 315/290
6,384,544 B1   5/2002 Greenwood et al.

FOREIGN PATENT DOCUMENTS

JP  60-262392  12/1985
JP  61-58793   3/1988
WO  WO 99/14991  3/1999

* cited by examiner

*Primary Examiner*—Wilson Lee
(74) *Attorney, Agent, or Firm*—Nixon Peabody LLP; David S. Safran

(57) ABSTRACT

A HID lamp light source device in which the disadvantage of acoustic resonance is avoided is achieved in a light source device in which a discharge lamp has a pair of opposed electrodes connected to a feed device which is used for starting the discharge lamp and for supplying a discharge current to the electrodes by the feed device using a switching device for controlling the amount of feed for the discharge lamp and in which phase modulation is added to the essentially periodic switching operation of the switching device.

2 Claims, 14 Drawing Sheets

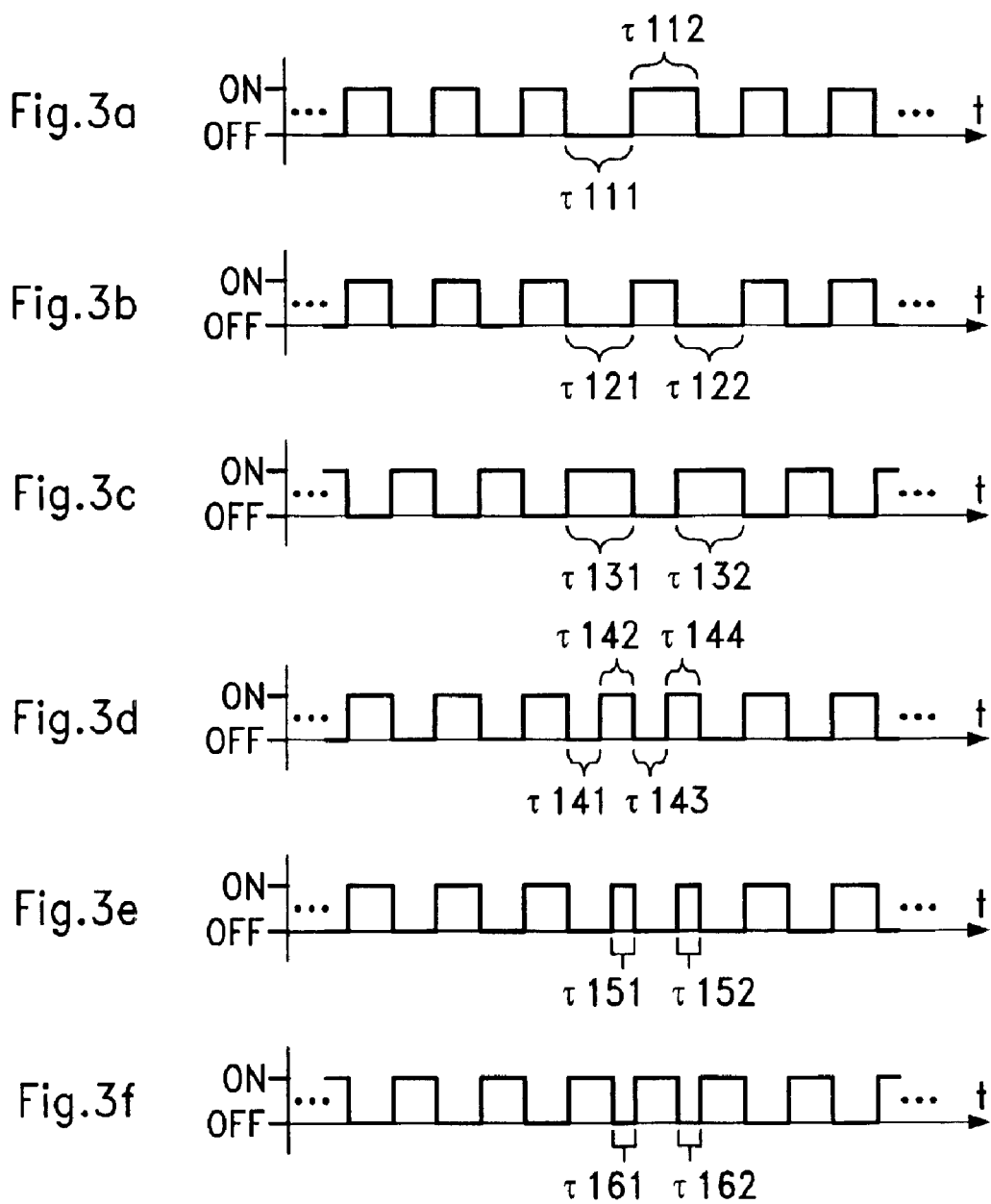

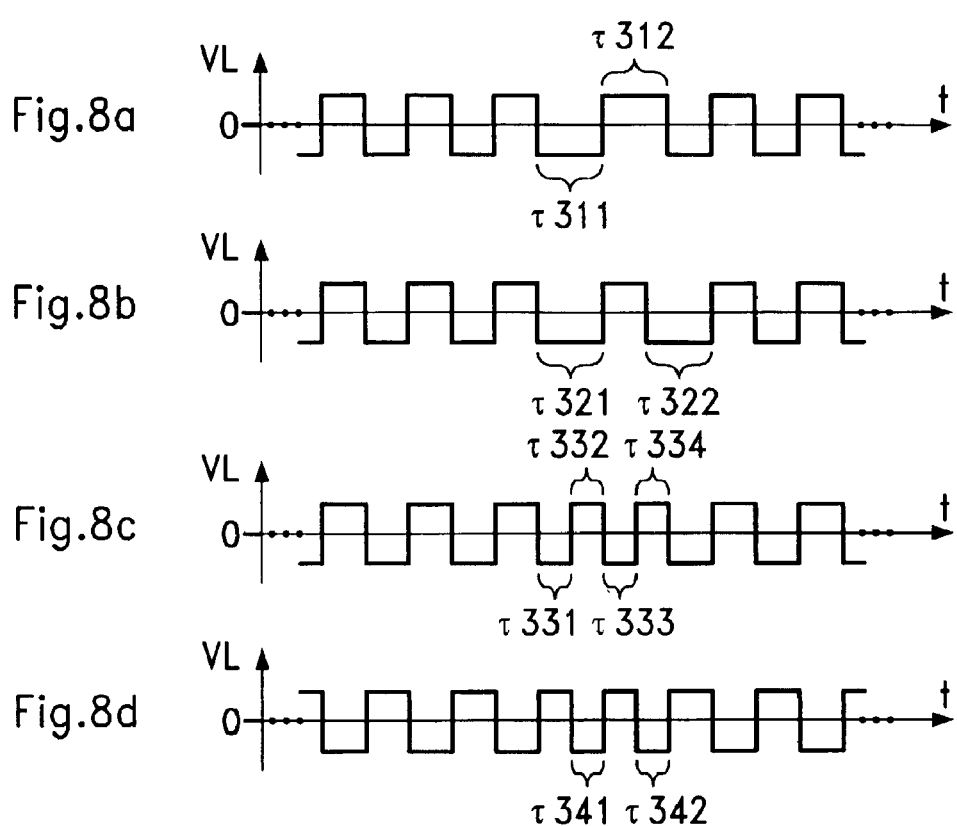

LIGHT SOURCE DEVICE

BACKGROUND OF THE INVENTION

1. Field of the Invention

The invention relates to a light source device using a discharge lamp with high radiance (HID lamp), such as a high pressure mercury discharge lamp, a metal halide lamp or the like, which is used, for example, as a light source for a projector.

2. Description of the Prior Art

In a light source device for an optical device, such as a liquid crystal projector, a DLP® projector (Texas Instruments) or the like, a discharge lamp, such as a HID lamp or the like, is used. With respect to driving the discharge lamp, direct current and alternating current drives exist. In the direct current drive, the polarity of the electrodes of the two poles of the discharge lamp, i.e., the cathode and the anode, is not changed. In the alternating current drive, the relation between the anode and cathode is changed essentially periodically. In the alternating current drive, with reference to the rate of the polarity change, i.e., with reference to the control frequency, driving with a wide frequency from a few dozen hertz to a few megahertz is possible.

In one such discharge lamp, the discharge space acts as an acoustic resonance cavity. In the case in which the frequency component of this resonant frequency and the frequency component of the feed current agree with one another or approach one another, a phenomenon which is called "acoustic resonance" occurs.

Generally, there are several resonant frequencies, corresponding to the lamp shapes. The value of the resonant frequency in itself depends on the dimensions and on the acoustic velocity of the gas within the discharge space. Therefore, the resonant frequency changes for each type of lamp. It also changes for each individual lamp of the same lamp type when the shape dimensions of the discharge space have variances. Furthermore, the resonant frequency also changes in the same lamps when the lamp temperature changes.

When a feed device is driven by the above described direct current drive, resonance occurs with respect to current ripple and its harmonic component. When driving takes place by the above described alternating current drive, resonance occurs with respect to the control frequency and its harmonic component. Furthermore, if there is ripple in the drive half-period, resonance occurs also with respect to its ripple component and its harmonic component.

When acoustic resonance occurs, the discharge arc within the discharge space oscillates. Therefore, there are cases in which the illuminance of the projector image has flicker, or in which, in extreme cases, the discharge disappears. As was described above, the frequency of the acoustic resonance changes differently according to lamp conditions. Furthermore, with respect to the different frequency components of the feed device, resonance occurs. Therefore, it was very difficult to separate the frequency of the acoustic resonance of the lamp and the frequency components of the feed device stably from one another.

In the prior art, such as, for example, in Japanese patent disclosure document SHO 63-58793, it is disclosed that the frequency of the ripple component and the degree of ripple are limited. However, as was described above, it is difficult to stably separate the frequency of the acoustic resonance of the lamp and the frequency components of the feed device from one another. Therefore, there were also cases in which implementation was not possible. Furthermore, for example, in Japanese patent disclosure SHO 60-262392, it is disclosed that the frequency band in which no acoustic resonance at all occurs, and the frequency band in which acoustic resonance can occur, are switched with a given period. This, however, cannot be used for the case in which the frequency band in which no acoustic resonance at all forms is not present.

In Japanese patent publication 2001-505360 and in U.S. Pat. No. 5,859,505, it is disclosed that the stability of lamp operation is measured and the frequency is dynamically switched. However, here, the disadvantages of a complicated arrangement and high costs arose.

Furthermore, in this frequency switching system, there were the disadvantages that, before and after switching of the frequency, the characteristics change, and that, in this way, there is the possibility of changing the emission amount when there is a peripheral circuit with frequency characteristics, such as a noise filter, a partial resonance circuit, an artificial resonance circuit or the like. To prevent this change from occurring, another concept is needed, for example, an increase in the speed of the feedback response of the lamp wattage control or a similar concept. This caused the disadvantages of complex circuitry and increased cost.

SUMMARY OF THE INVENTION

A primary object of the present invention is to devise an HID lamp light source device in which the disadvantage of acoustic resonance is avoided.

In a first aspect of the described invention, in a light source device in which a discharge lamp having a pair of opposed electrodes is connected to a feed device (Ex) which is used for starting the above described discharge lamp and for supplying a discharge current to the above described electrodes, this object is achieved in that the feed device uses a switching device for controlling the amount of feed for the discharge lamp and that phase modulation is added to the essentially periodic switching operation of the above described switching device.

In another aspect of the described invention, in a light source device in which a discharge lamp having a pair of opposed electrodes is connected to a feed device which is used for starting the discharge lamp and for supplying a discharge current to the electrodes, the object is achieved in that the above described feed device supplies alternating current to the discharge lamp and that, in feed operation of the essentially periodic alternating current drive, phase modulation additionally takes place.

In another aspect of the invention, in a feed device which is used for starting the discharge lamp and for supplying a discharge current, the object is achieved in that the switching device is used to control the amount of feed for the discharge lamp and that phase modulation occurs in addition to the essentially periodic switching operation of the above described switching device.

In still another aspect of the invention, in a feed device which is used for starting the discharge lamp and for supplying a discharge current, the object is achieved in that alternating current is supplied to the discharge lamp and that phase modulation occurs in addition in the feed operation of the essentially periodic alternating current drive.

The difference from the frequency switching method described in the prior art, i.e., the frequency modulation method, is described in simplified form below. Both frequency modulation and also the phase modulation used in the invention are a type of modulation methods which is called "angle modulation," but the two differ from one another.

As has already been described in the prior art, in an application for the feed device of a HID lamp in the frequency modulation method, there was the disadvantage that, in the case in which there is a peripheral circuit with frequency characteristics, the characteristics change before and after switching of the frequency. Therefore, there were cases in which, for example, the disadvantage arises that the radiance of the lamp changes during an operating interval with a certain frequency and during an operating interval with a different frequency or that by switching the frequency the characteristics change and the radiance of the lamp during a transition interval changes up to completion of the its correction by a feedback system.

In the case of the phase modulation method used in accordance with the invention, however, the frequency of the chopper or of the inverter of the feed device is generally the same overall. In the area in which a phase change is produced, nonuniformity occurs only for an instant in the periodicity. Therefore, there is the advantage that, in the case in which there is a peripheral circuit with frequency characteristics, the effect of the phase change is also extremely low with respect to the ratio to the whole.

Therefore, in the case in which the goal is to reduce the operating loss of the chopper by technology such as a partial resonance circuit, an artificial resonance circuit or the like, the technology of phase modulation can be used at the same time without losing the advantages of this technology.

Therefore, of course, it is also possible to carry out the invention according to the first and second aspect of the invention at the same time.

The invention is further described below using several embodiments shown in the drawings.

BRIEF DESCRIPTION OF THE DRAWINGS

FIGS. 3a to 3f each show a schematic of another example of chopper operation of the feed device of the light source device in accordance with the invention;

FIGS. 8a to 8d each show a schematic of another example of the operation of the inverter of the feed device of a light source device in accordance with the invention of the alternating current drive type;

DETAILED DESCRIPTION OF THE INVENTION

Figure 1:
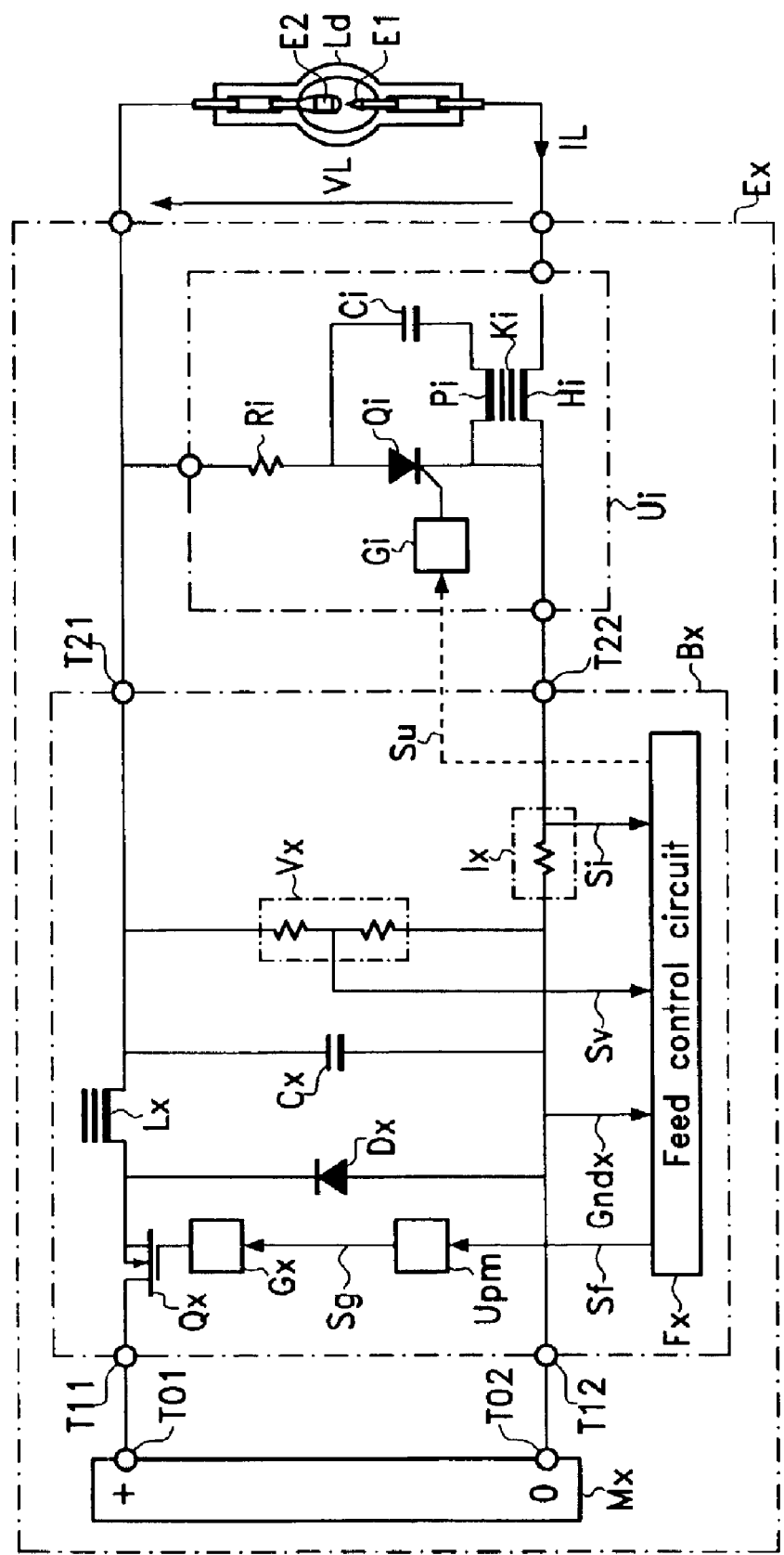
FIG. 1 shows a schematic of an example of the arrangement of a light source device in accordance with the invention of the direct current driving type by a feed device of the voltage reduction chopper type in a simplified representation.

FIG. 1 is a simplified representation of one example of the arrangement of a light source device in accordance with the invention, of the above described direct current drive type. In the feed device (Ex), a ballast circuit (Bx) of the voltage reduction chopper type is operated by receiving a voltage feed from the direct current source (Mx), such as a PFC (power factor corrector) or the like. In this way, the feed amount for a discharge lamp (Ld) is regulated. In the ballast circuit (Bx), a switching device (Qx), such as a FET or the like turns the current from the direct current source (Mx) on and off and a smoothing capacitor (Cx) is charged via a choke (Lx). This voltage is applied to the discharge lamp (Ld). In this way, current can be allowed to flow in the discharge lamp (Ld).

During the interval during which the switching device (Qx) is in the ON state, charging of the smoothing capacitor (Cx) and current supply to the discharge lamp (Ld) as a load are carried out directly by the current through the switching device (Qx), and moreover, energy in the form of a flux is stored in the choke (Lx). During the interval during which the switching device (Qx) is in the OFF state, the energy stored in the form of a flux in the choke (Lx) charges the smoothing capacitor (Cx) via a fly-wheel diode (Dx) and current is supplied to the discharge lamp (Ld).

In the ballast circuit (Bx) of the voltage reduction chopper type, as a result of the ratio of the interval during which the switching device (Qx) is in the ON state to the operating period of the switching device (Qx), i.e., as a result of the pulse duty factor, the amount of feed for the discharge lamp can be regulated.

In a starter (Ui), a capacitor (Ci) is charged by the lamp voltage (VL) via a resistor (Ri). When the gate driver circuit (Gi) is activated, a switching device (Qi) which formed by a thyristor or the like is closed. In this way, the capacitor (Ci) is discharged via the primary winding (Pi) of a transformer (Ki), and on the secondary winding (Hi), a high voltage pulse is formed. The high voltage which has formed on the secondary winding (Hi) of the starter (Ui) is superimposed by the output voltage of the ballast circuit (Bx) and lies between the electrodes (E1, E2). Thus, discharge of the discharge lamp (Ld) can be started.

A gate driver signal (Sg) is produced by a gate driver signal generating circuit (Upm); this signal has a certain pulse duty factor. Because the gate driver signal (Sg) via the gate driver circuit (Gx) controls the gate terminal of the switching device (Qx), turning the current from the direct current source (Mx) on and off is controlled.

The lamp current (IL) which flows between the electrodes (E1, E2) of the discharge lamp (Ld), and the lamp voltage (VL) which forms between the electrodes (E1, E2) can be determined by a current determination means (Ix) and a voltage determination means (Vx). The current determination means (Ix) can be easily implemented using a shunt resistor and the voltage determination means (Vx) can be easily implemented using a voltage divider resistor.

A lamp current signal (Si) from the current determination means (Ix) and a lamp voltage signal (Sv) from the voltage determination means (Vx) are supplied to the feed control circuit (Fx). The setpoint of the lamp current signal (Si) is established such that the lamp wattage reaches an expected value as the product of the lamp current (IL) and the lamp voltage (VL). An error integration signal (Sf) is controlled such that the error between this setpoint and the actually measured value decreases.

A suitable pulse duty factor in the gate driver signal generation circuit (Upm) as a result of the error integration signal (Sf) is given by pulse width modulation. Thus a gate driver signal (Sg) is produced which is controlled by feedback.

The invention is described first according to the first aspect.

As was described above, the switching device (Qx) effects repetition of the on and off process. The current supplied to the discharge lamp (Ld) therefore contains a ripple component. Specifically, the current supplied from the choke (Lx) increases essentially linearly when the switching device (Qx) is turned on, by which the lamp current also increases essentially linearly. Conversely, if the switching device (Qx) is turned off, the current supplied by the choke (Lx) decreases essentially linearly, by which the lamp current also decreases essentially linearly. This means that the lamp current contains a ripple component which repeatedly increases or decreases around a certain average value.

When this ripple component agrees with or approaches the frequency of acoustic resonance which the discharge lamp (Ld) has, acoustic resonance forms. Generally, a resonance phenomenon is formed by a system selectively storing the oscillation energy when the system experiences periodic interference in the vicinity of the resonant frequency. So that a resonance phenomenon does not occur to a damaging degree, there is a growth time of the resonance for this energy storage, i.e., a time delay even if the system experiences interference which coincides with the resonant frequency.

To describe this by analogy to another resonance phenomenon, for example, a pendulum system can be named in which the weight and the articulation point are connected to a thread. The oscillation number of the pendulum is determined by the thread length. This oscillation number becomes the resonant frequency.

Assuming that the pendulum is first at rest, in the case of horizontal movement of the articulation point with an extremely small amplitude at the same frequency as the resonant frequency, oscillation energy is supplied to the pendulum by the resonance. The resting pendulum gradually increases amplitude. This does not mean that the pendulum oscillates vigorously at the same time with the start of the motion of the articulation point.

In a resonance phenomenon, the phase of the oscillation of the pendulum generally has a lag of roughly 90 degrees with respect to the phase of motion of the articulation point as interference.

Figure 2A:
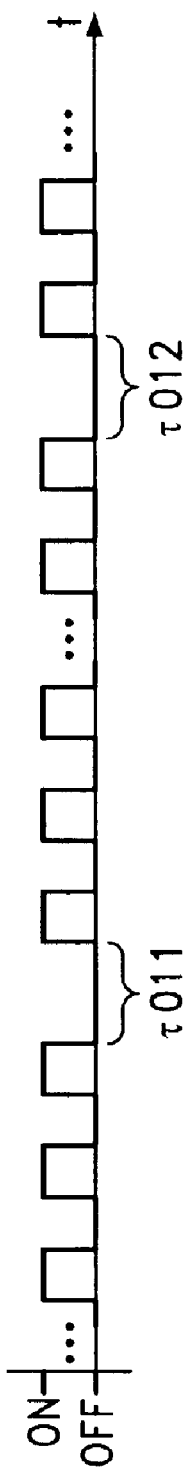
FIGS. 2a to 2d each show a schematic of one example of chopper operation of the feed device of the light source device in accordance with the invention.

FIG. 2a is a schematic of the state in which, in accordance with the invention, the repetition operation of turning the switching device (Qx) on and off undergoes phrase modulation. This phase modulation can be carried out at the same time in the gate driver signal generating circuit (Ump) which is shown above in FIG. 1 when pulse width modulation is being carried out.

In the first aspect of the invention, with respect to periodic switching operation of the switching device (Qx), an interval ($\tau 011$) is made longer than the other periods. In this way, a suitable amount of phase shift, i.e., phase modulation, is achieved. In this way, the acoustic resonance of the lamp which has increased before the interval ($\tau 011$) can be attenuated.

When this situation is again described using the above described example of the pendulum, the amplitude of the pendulum can be reduced in tendency by suitably shifting the phase in which the oscillation of the pendulum which has begun to increase by the motion of the articulation point with the resonant frequency moves the articulation point (without changing the frequency).

In this case, the process is such that the phase of motion of the articulation point with respect to the phase of the oscillation of the pendulum has a lag of roughly 90 degrees in order to effectively reduce the amplitude of the pendulum.

Of course, since the resonance begins to grow sooner or later in the direction of increasing, even if the acoustic resonance of the lamp has been attenuated by the phase shift for interval ($\tau 011$), for an interval ($\tau 012$) after a suitable time has passed, there must be another phase shift. It is necessary to periodically or essentially periodically repeat this additional phase shift. The correct value of the frequency of this repetition must be experimentally determined.

From the above description using the example of the pendulum, it is necessary that, for the phase shifts given in times ($\tau 011$, $\tau 012$, . . . ) from a leading state of roughly 90 degrees to a trailing state of roughly 90 degrees, a shift of roughly 180 degrees is given. However, in the case of acoustic resonance of the lamp, it is not always optimum due to the nonlinear shape 180 degrees. Here, a suitable amount of phase shift, i.e., a suitable amount of phase leading or phase trailing, must be experimentally determined.

Figure 2B:
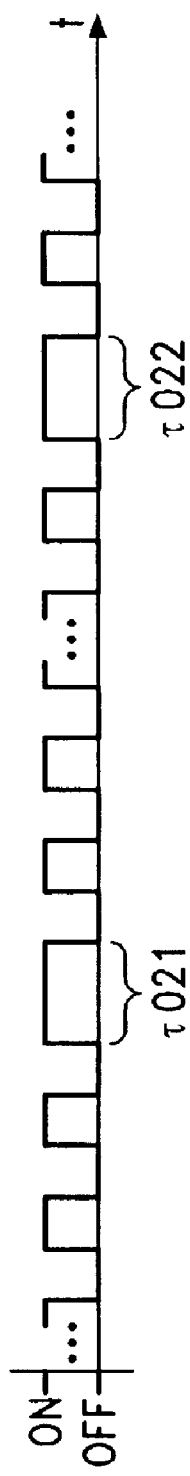
Figure 2C:
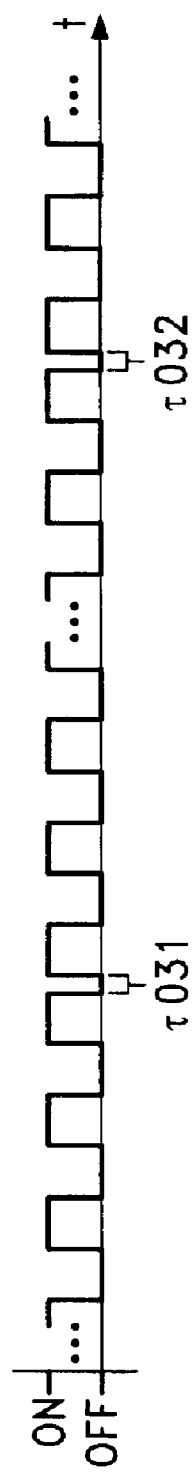
Figure 2D:
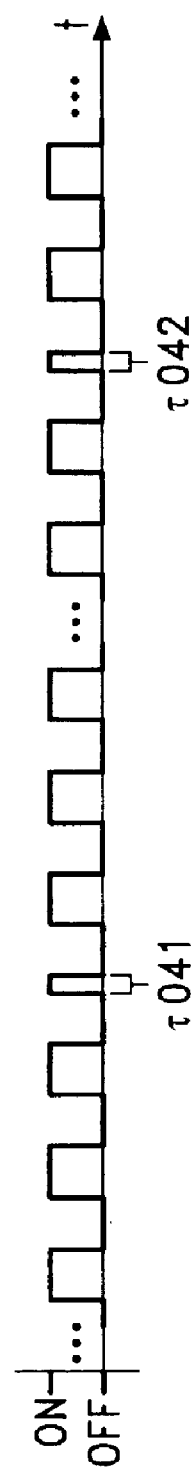

The phase shift can be determined in the times ($\tau 011$, $\tau 012$, . . . ) as follows:

by prolonging the OFF interval of the switching device (Qx) as was described above using FIG. 2a;
by prolonging the ON interval in times ($\tau 021$, $\tau 022$, . . . ) as shown in FIG. 2b;

by shortening the OFF interval in times ($\tau 031, \tau 032, \ldots$) as shown in FIG. 2c;

by shortening the ON interval in times ($\tau 041, \tau 042, \ldots$) as shown in FIG. 2d.

Furthermore, besides the cases which are described above using FIGS. 2a to 2a and in which a one-time, required phase shift is given by a single ON interval or a single OFF interval, a one-time phase shift can be given over several ON times or several OFF times. For example, the following can be performed:

by prolonging the OFF interval ($\tau 111$) and the ON interval ($\tau 112$) as shown in FIG. 3a;

by prolonging the OFF times ($\tau 121, \tau 122$) as shown in FIG. 3b;

by prolonging the ON times ($\tau 131, \tau 132$) as shown in FIG. 3c;

by shortening the OFF times ($\tau 141, \tau 143$) and ON times ($\tau 142, \tau 144$) as shown in FIG. 3d;

by shortening the ON times ($\tau 151, \tau 152$) as shown in FIG. 3e; or by shortening the OFF times ($\tau 161, \tau 162$) as shown in FIG. 3f.

Figure 4:
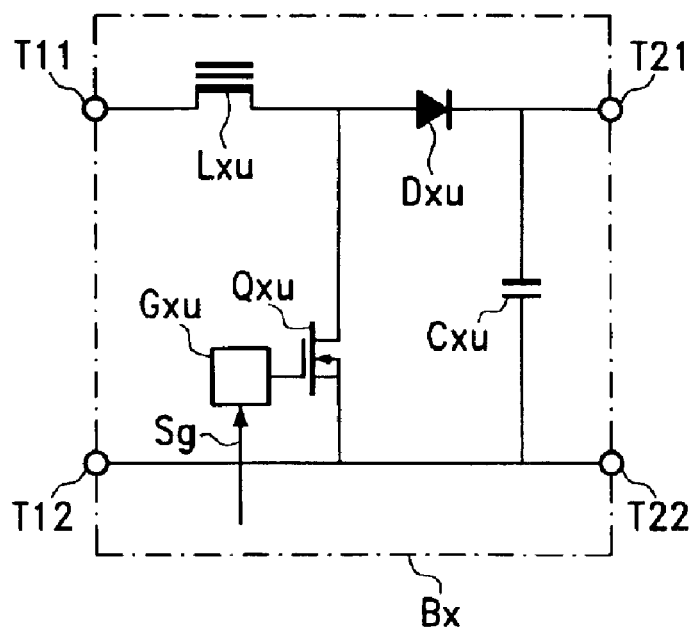
FIG. 4 shows a schematic of one example of a voltage increasing chopper.
Figure 5:
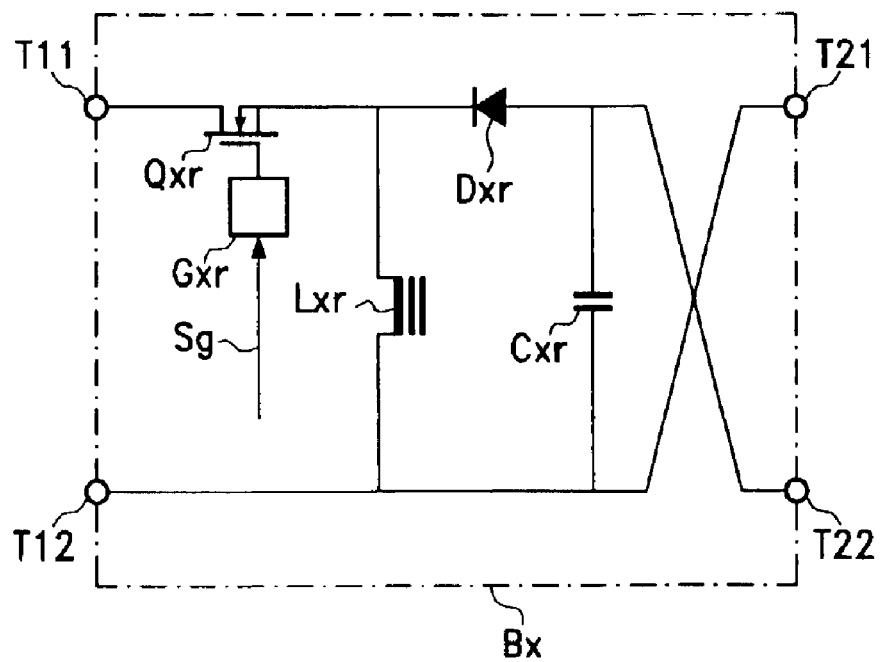
FIG. 5 shows a schematic of one example of an inverting chopper.

In FIG. 1, a ballast circuit using a voltage reducing chopper is described. However, the action of the invention is also advantageously developed in a ballast circuit using a voltage increasing chopper as shown in FIG. 4, in a ballast circuit using an inverting chopper as shown in FIG. 5 or in a ballast circuit of another type when essentially periodic switching operation is carried out by a switching device.

The description was given above based on a light source device of the direct current drive type. However, the effect of the ripple of the lamp current when such a discharge lamp is operating is also the same in an alternating current drive type. This is because the above described phenomenon which occurs in the case of direct current driving can also occur in the case of alternating current driving because the interval with a half period, after inversion of the polarity up to the next inversion in the case in which, for example, an alternating discharge voltage with an acute-angled wave is briefly applied to the discharge lamp, has no difference from direct current driving.

Figure 6:
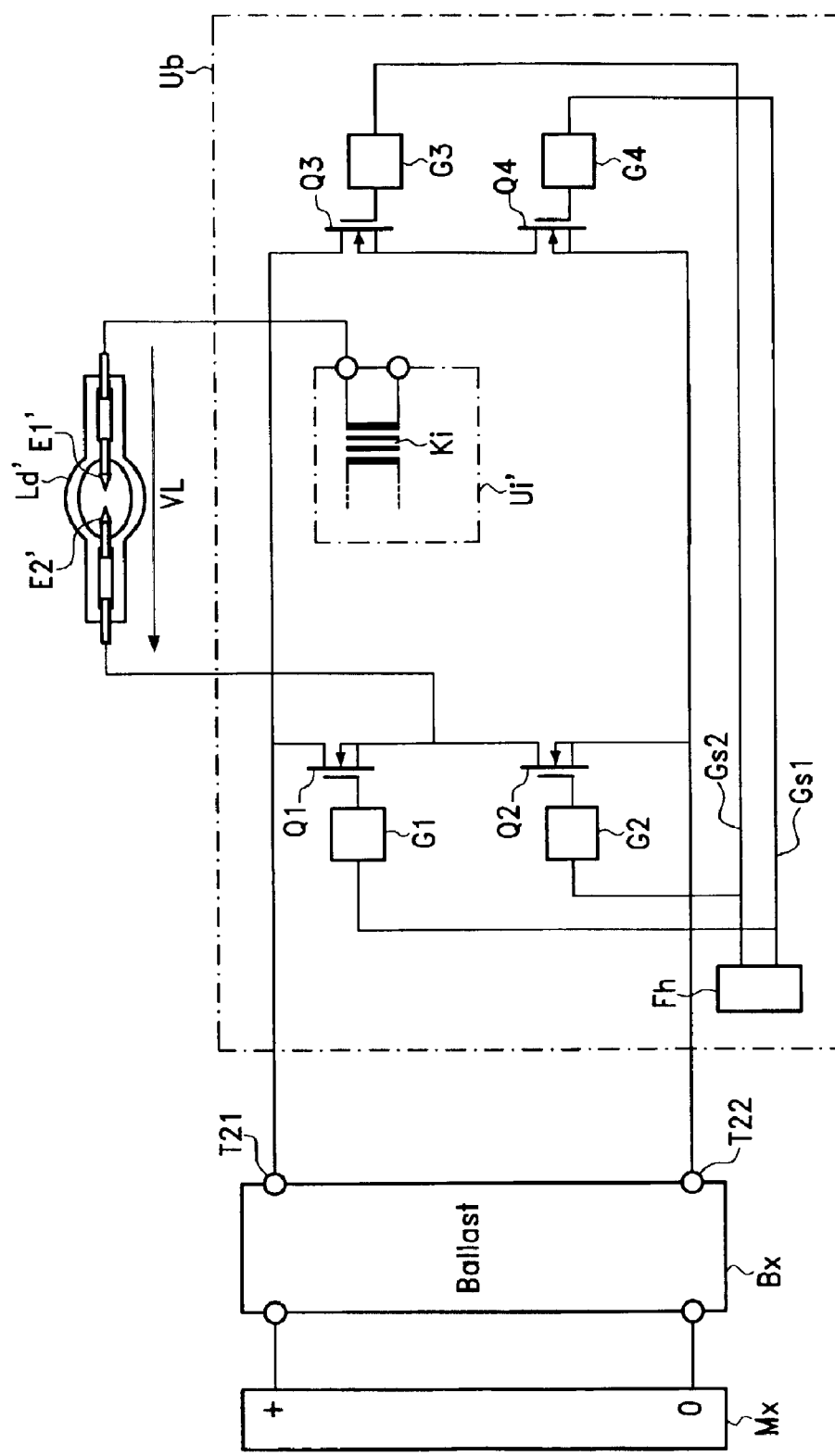
FIG. 6 shows a schematic of one example of the arrangement of a light source device in accordance with an embodiment of the invention of the alternating current drive type in a simplified representation.

Also, in the light source device of the alternating current drive type shown in FIG. 6, in which by installing an inverter (Ub) of the full bridge type, by the fact that switching devices (Q1, Q2, Q3, Q4) such as FETs or the like are added to the rear stage of the ballast circuit (Bx) by the above described voltage reducing chopper or the like, an alternating discharge voltage with an acute-angled wave is applied to the discharge lamp (Ld'), the invention can be used in a voltage reducing chopper of this ballast circuit (Bx) for switching operation of the switching device (Qx). The action of the invention is thus advantageously developed.

In the inverter (Ub) of the full bridge type described in FIG. 6 the following two states are repeated in alternation:

the state in which only the switching device (Q1) and the switching device (Q4) are closed as by a FET or the like; and the state in which only the switching device (Q2) and the switching device (Q3) are closed.

Here, between the above described two states, a short interval is inserted during which, for example, no switching device at all is closed in order to prevent the switching device (Q1) and the switching device (Q2) together with the switching device (Q3) and the switching device (Q4) from being closed at the same time. This control of the respective switching device is carried out based on the signal from an inverter control circuit (Fh) via gate driver circuits (G1, G2, G3, G4) which are part of the respective switching device.

Of course, also when using the above described voltage increasing chopper or the above described inverting chopper as the ballast circuit (Bx) shown in FIG. 6, the invention can be used for switching operation of the switching device of this ballast circuit (Bx). The action of the invention is advantageously developed.

Furthermore, the invention can also be used, for example, for an inverter of the half bridge type instead of an inverter of the full bridge type shown in FIG. 6. The action of the invention is advantageously developed.

The invention is described below according to a second aspect.

The effect of ripple was described above using the example of the light source device of alternating current driving described in FIG. 6. But, it is also possible for acoustic resonance of the lamp to occur by the alternating current drive component of the inverter even if it is assumed that the ballast circuit (Bx) does not produce any ripple.

The reason for this is the following:

The waveform of the absolute value of the lamp current cannot be made completely a direct current because the rising and falling rate is limited even if the voltage which has been applied to the lamp has an acute-angled waveform, and even if the lamp current thus has an acute-angled waveform. Therefore, there are cases in which the harmonic component thereof agrees with the frequency of acoustic resonance of the lamp or approaches it even if the fundamental frequency is low. Furthermore, there are cases in which, by increasing the frequency of the inverter, the fundamental frequency agrees with the frequency of the acoustic resonance of the lamp or approaches it even if it is assumed that the lamp current is a sine wave.

Figure 7A:
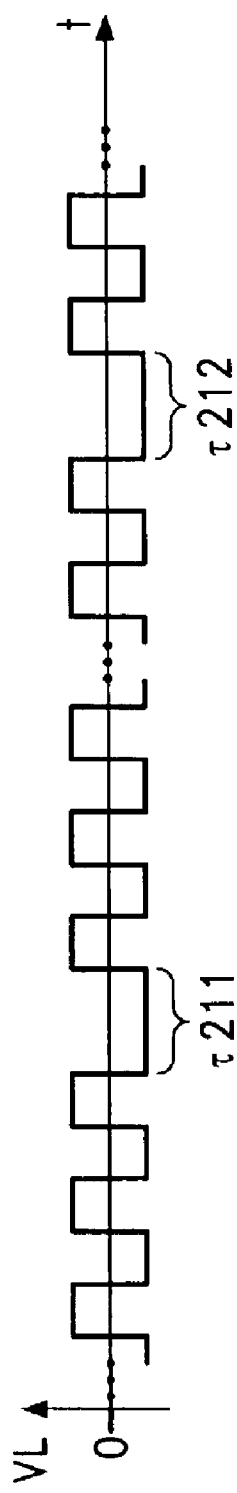
FIGS. 7a and 7b each show a schematic of one example of the operation of the inverter of the feed device of a light source device in accordance with the invention of the alternating current drive type.

FIG. 7a is a schematic of repetition operation of inversion of the above described inverter in the invention. The y axis plots the lamp voltage (VL). According to the second aspect of the invention, with respect to periodic inversion operation of the above described inverter, the interval ($\tau 211$) is prolonged. In this way, a suitable amount of phase shift, i.e., phase modulation, is produced. In this way, the acoustic resonance of the lamp which has increased before interval ($\tau 211$) can be attenuated.

Since, of course, the resonance begins to grow sooner or later in the direction of increasing, even if the acoustic resonance of the lamp has been attenuated by the phase shift for the interval ($\tau 211$), for an interval ($\tau 212$) after a suitable time has passed there must be a phase shift again. It is necessary to periodically or essentially periodically repeat this addition of phase shift. The correct value of the frequency of this repetition must be experimentally determined.

For the phase shifts given in times ($\tau 211, \tau 212, \ldots$), it is necessary to give a shift of roughly 180 degrees from a leading state of roughly 90 degrees to a trailing state of roughly 90 degrees. In the case of acoustic resonance of the lamp, however, it is not always optimum due to the nonlinear shape 180 degrees. Here, a suitable amount of phase shift, i.e., a suitable amount of phase leading or phase trailing, must be experimentally determined.

Figure 7B:
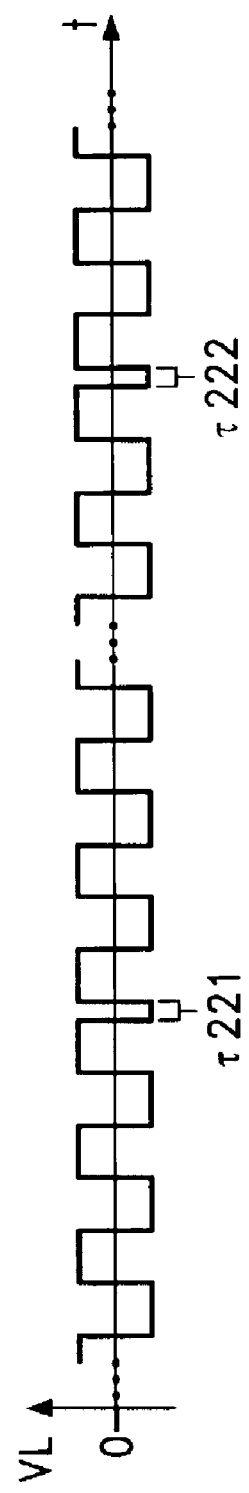

The phase shift can be determined in the times ($\tau 211, \tau 212, \ldots$) as follows:

by prolonging the interval during which the lamp voltage has one of the polarities as was shown above using FIG. 7a; or by shortening the interval during which the lamp voltage in times ($\tau 221, \tau 222, \ldots$) has one of the polarities as is shown using FIG. 7b;

Furthermore, besides the case which is shown in FIGS. 7a & 7b and in which a one time phase shift required is produced by a single interval during which the lamp voltage is at one of the polarities, over several times at which the lamp voltage is at a certain polarity there can be a one-time phase shift. For, example the following can be done:

by prolonging the interval (τ311) during which the lamp voltage is at one of the polarities, and the interval (τ312) during which the following lamp voltage is at the other polarity as shown in FIG. 8a;

by prolonging the times (τ321, τ322) at which the lamp voltage is at one of the polarities, as shown in FIG. 8b;

by shortening the times (τ331, τ332) at which the lamp voltage is at one of the polarities and the times (τ332, τ334) at which the lamp voltage is at the other polarity, as shown in FIG. 8c; or by shortening the times (τ341, τ342) at which the lamp voltage is at one of the polarities, as shown in FIG. 8d.

In the ballast circuit described above using FIG. 6, of course, the invention can be used regardless of the its type (chopper of the voltage reduction type, chopper of the voltage increasing type, or inverting chopper). Furthermore, the invention can also be used for example, for an inverter of the half bridge type instead of an inverter of the full bridge type which is shown in FIG. 6. The action of the invention is advantageously developed.

Figure 9:
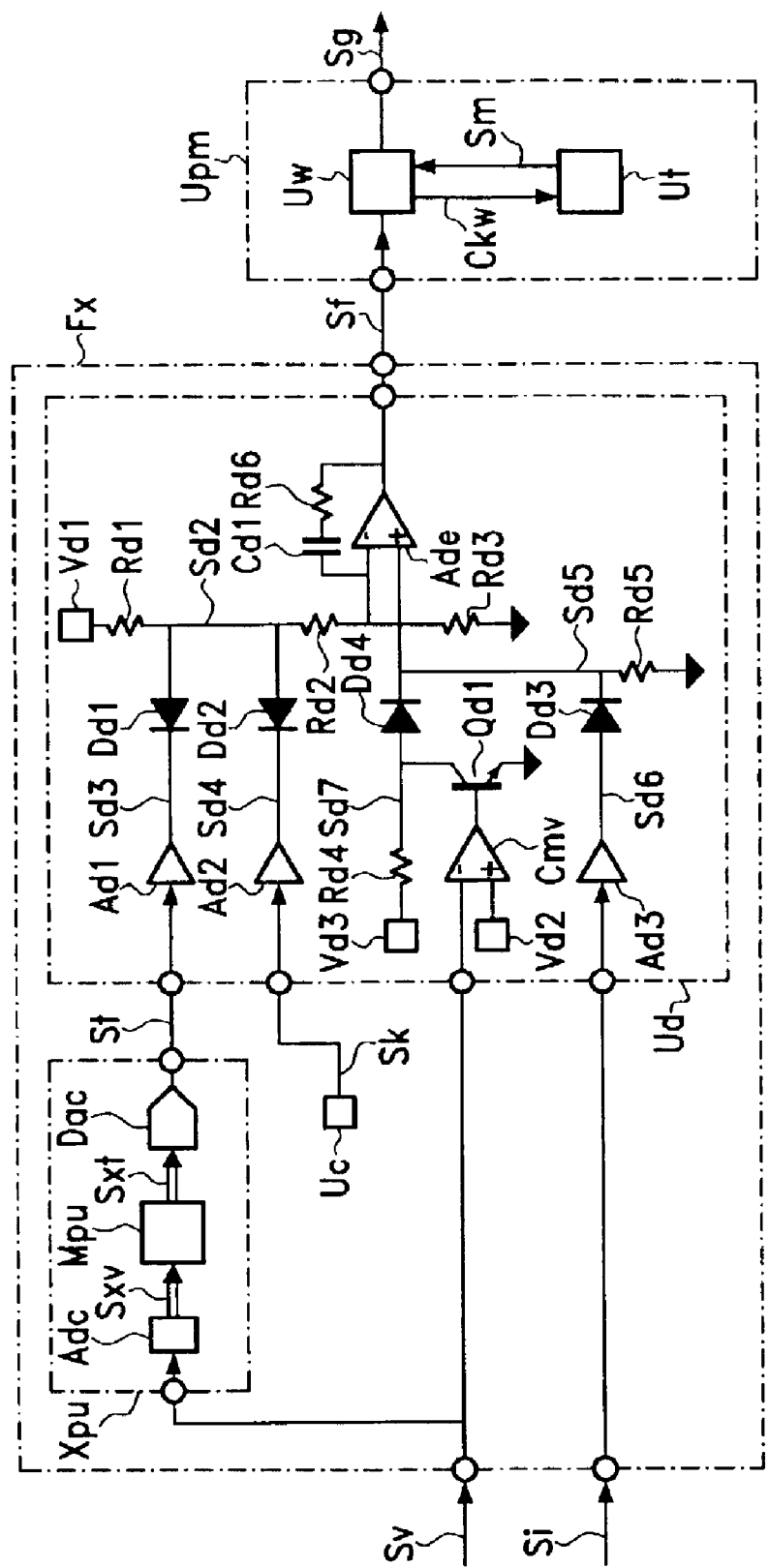
FIG. 9 shows a schematic of one example of the arrangement of a feed control circuit and a gate driver signal generation circuit of the light source device in accordance with the invention.

First, a first embodiment of the invention is described. FIG. 9 shows an example of the arrangement of a feed control circuit (Fx) and a gate driver signal generation circuit (Upm) in the light source device in accordance with the invention described above using FIG. 1 in a simplified representation.

The above described lamp voltage signal (Sv) is input into an A/D converter (Adc) into an overall control element (Xpu), converted into digital lamp voltage data (Sxv) with a suitable place number and is input into a microprocessor unit (Mpu) which comprises a CPU, a program memory, a data store, a circuit for generating the clock pulse, a time counter, an IO controller for input and output of a digital signal and the like, and which based on computations in which the above described lamp voltage data (Sxv) are taken as the reference, and based on the assessment of the conditions which correspond to the state of the system at this instant, produces setpoint data for control of the chopper capacity (Sxt) for the chopper capacity control circuit (Ud) described below. The above described setpoint data for control of the chopper capacity (Sxt) are converted by a D/A converter (Dac) into analog setpoint signals (St) for controlling the chopper capacity and are input into the chopper capacity control circuit (Ud).

Furthermore, an upper boundary signal (Sk) of the lamp current which is used to fix the allowable upper boundary value ILmax of the lamp current (IL) is produced by a circuit (Uc) for producing the upper boundary signal of the lamp current and is input into the chopper capacity control circuit (Ud).

In the chopper capacity control circuit (Ud), the setpoint signal (St) for controlling the chopper capacity, via an amplifier or a buffer (Ad1) which is installed, if necessary, and via a diode (Dd1), and furthermore, the upper boundary signal (Sk) of the lamp current, via an amplifier or a buffer (Ad2) which is installed, if necessary, and via a diode (Dd2), are each connected to one end of a "pull-up" resistor (Rd1), by which a setpoint signal (Sd2) for chopper driving is produced. The other end of the "pull-up" resistor (Rd1) is connected to a reference voltage source (Vd1) with a suitable voltage.

The setpoint signal (Sd2) for chopper driving is, therefore, a signal which is formed by a smaller signal being selected from the following two signals, i.e., from a signal (Sd3) which corresponds to the setpoint signal (St) for controlling the chopper capacity, and from a signal (Sd4) which corresponds to the upper boundary signal (Sk) of the lamp current.

When the overall control element (Xpu), in some way, produces the setpoint signal (St) for controlling the chopper capacity, such as, for example, by division of a constant which corresponds to the rated wattage by the lamp voltage data (Sxv), by computing the value of the lamp current (IL) for achieving the rated wattage, by producing the setpoint signal (St) according to this value and by similar methods, within the chopper capacity control circuit (Ud) the setpoint signal (Sd2) for chopper driving is limited by hardware, even if this is not suitable, in such a way that the lamp current (IL) does not exceed the upper boundary signal (Sk) of the lamp current.

Control via the A/D converter (Adc) or the microprocessor unit (Mpu) has a low operating speed (or costs increase when speed is increased). In the case in which, for example, a situation arises in which the discharge state of the lamp has changed quickly, therefore, by time delay of operation, unsuitability of the setpoint signal (St) for control of the chopper capacity can arise. That this current limitation function is performed by hardware is also useful with respect to the protection of the lamp and the feed device.

On the other hand, the lamp current signal (Si) is connected via an amplifier or a buffer (Ad3) which is installed if necessary, and via a diode (Dd3) to the other end of a "pull-down" resistor (Rd5), with one end connected to ground (Gndx). Thus, the signal which is to be controlled (Sd5) is produced.

Furthermore, the lamp voltage signal (Sv) is compared by a comparator (Cmv) to the voltage of a reference voltage source (Vd2) which has a voltage which corresponds to the above described no-load voltage. When the lamp voltage signal (Sv) is higher than the no-load voltage, a transistor (Qd1) is shifted into the OFF state or an active state. Because current is allowed to flow from a suitable voltage source (Vd3) via a resistor (Rd4) and a diode (Dd4) into the above described "pull-down" resistor (Rd5), operation is carried out such that the level of the signal (Sd5) which is to be controlled is increased.

Conversely, if the lamp voltage signal (Sv) is lower than the no-load voltage, the transistor (Qd1) is shifted into the ON state; this leads to a short circuit of the current from the voltage source (Vd3). The signal (Sd5) which is to be controlled thus corresponds to the lamp current signal (Si).

The reason for this is that, in the circuit formed of the "pull-down" resistor (Rd5), the diode (Dd3) and the diode (Dd4), a voltage is chosen, is formed in the "pull-down" resistor (Rd5), and is selected according to the larger signal from the anode-side signals (Sd6) and (Sd7) of the diodes.

In the comparator (Cmv), by inserting direct feedback resistors (not shown) into its output terminal and its noninverting input terminal, comparison operation can have hysteresis. In this way, an unintentional oscillation phenomenon can be prevented when the comparison output changes.

Due to this arrangement, the signal (Sd5) to be controlled rises quickly when the lamp voltage signal (Sv) tries to exceed the above described no-load voltage even if there is a state in which the output current almost stops and in which lamp current signal (Si) hardly occurs. In this way, the lamp voltage (VL) is always limited by hardware essentially to less than or equal to the no-load voltage.

The setpoint signal (Sd2) for chopper driving is subject to voltage division by a resistor (Rd2) and a resistor (Rd3) and is input into the inverting input terminal of an operational amplifier (Ade). On the other hand, the signal (Sd5) to be controlled is input into the noninverting input terminal of the operational amplifier (Ade). Since the output of the operational amplifier (Ade), i.e., the error integration signal (Sf), is fed back via the integral capacitor (Cd1) and a speed increasing resistor (Rd6) with the inverting input terminal, the operational amplifier (Ade) works as an error integration circuit which integrates the difference between the divided voltage of the setpoint signal (Sd2) for chopper driving by the resistor (Rd2) and the resistor (Rd3) and the voltage of the signal (Sd5) to be controlled.

The error integration signal (Sf) is input into the gate modulation circuit (Uw) of the gate driver signal generation circuit (Upm) and produces the gate driver signal (Sg) by PWM modulation. The gate modulation circuit (Uw), upon reception of the phase modulation signal (Sm) of the phase modulation control circuit (Ut), produces phase modulation when the gate driver signal (Sg) is produced. The gate modulation circuit (Uw) produces a timing pulse (Ckw) which is necessary for operation of the phase modulation control circuit (Ut).

Figure 10:
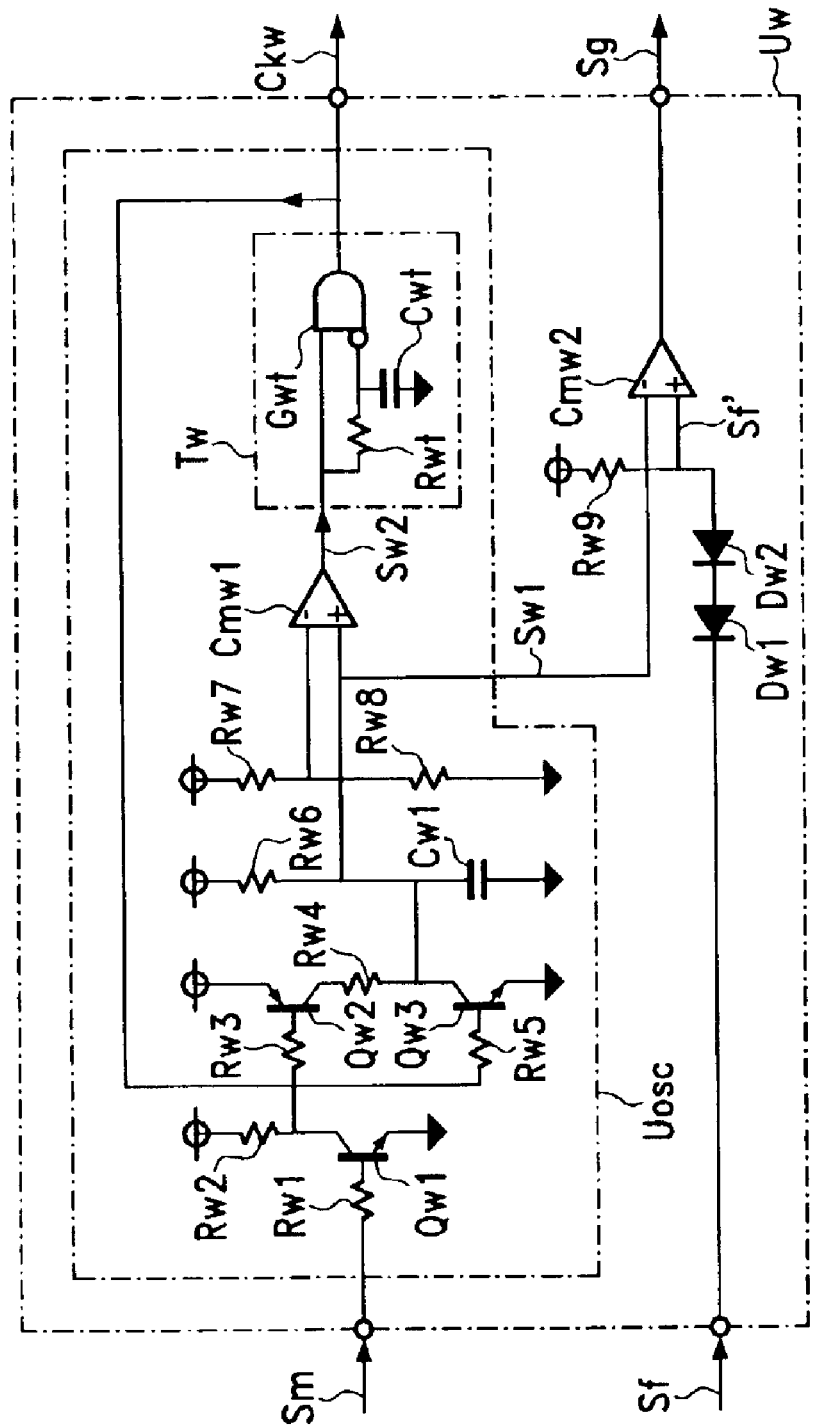
FIG. 10 shows a schematic of one example of the arrangement of a gate modulation circuit for a chopper of the feed device of the light source device in accordance with the invention.

FIG. 10 shows an example of the arrangement of the gate modulation circuit (Uw) in a simplified representation. Here, a capacitor (Cw1) is charged by a direct current source (Vcc) which has a suitable voltage via a resistor (Rw6). The charging rate is fixed by the resistance value of the resistor (Rw6) and the electrostatic capacity of the capacitor (Cw1). The voltage of the capacitor (Cw1), i.e., the charging voltage signal (Sw1), increases monotonically in time, as is shown, for example, in FIG. 12a.

The voltage of the direct current source (Vcc) is subject to voltage division by voltage divider resistors (Rw7, Rw8) with a suitable ratio and input into the input terminals of a comparator (Cmw1). The charging voltage signal (Sw1) is input into the other input terminals of the comparator (Cmw1) and is compared to the voltages on the partial pressure resistors (Rw7, Rw8).

When the voltage of the charging voltage signal (Sw1) becomes higher than the voltages on the voltage divider resistors (Rw7, Rw8), the comparator (Cmw1) outputs a signal with a high level (Sw2) (FIG. 12b). When this signal is received, a monostable multivibrator (Tw) produces the above described timing pulse (Ckw) with a high level and with a constant time width (FIG. 12c) which is sent to the phase modulation control circuit (Ut), as was described above. At the same time, a transistor (Qw3) is shifted into the ON state via a resistor (Rw5). In this way, the charging voltage signal (Sw1) drops to essentially 0 volt in order to discharge the electrical charge of the capacitor (Cw1). This state is maintained during the interval during which the timing pulse (Ckw) is at a high level.

When the adjustment time of the monostable multivibrator (Tw) is running, the timing pulse (Ckw) returns to a low level and charging of the capacitor (Cw1) is begun again because the transistor (Qw3) moves into the OFF state. To repeat this operation, the charging voltage signal (Sw1) has essentially a sawtooth waveform (FIG. 12a).

Since, for the time width with a high level of the monostable multivibrator (Tw), a time width is sufficient at which at least the discharge of the capacitor (Cw1) is carried out reliably by the transistor (Qw3), in FIG. 10, the simplest example was described, specifically a method in which the signal (Sw2) of the comparator (Cmw1) is masked by the output of the time delay circuit using a resistor (Rwt) and a capacitor (Cwt) by a gate (Gwt). But, other methods can also be used.

By connecting the error integration signal (Sf) via a resistor (Rw9) and diodes (Dw1, Dw2) to the direct current source (Vcc) which has a suitable voltage, a signal (Sf') from one terminal on the side of the diode (Dw2) of the resistor (Rw9) becomes a signal which is formed by the residual offset in the amount of the forward voltages of the diodes (Dw1, Dw2) being added to the error integration signal (Sf). This signal (Sf') and the charging voltage signal (Sw1) with an essentially sawtooth waveform are compared to one another by a comparator (Cmw2). During the interval during which the voltage of the charging voltage signal (Sw1) is higher than the voltage of the signal (Sf'), the gate driver signal (Sg) which reaches a high level is produced. In FIG. 12a, the level of the signal (Sf') is shown using a broken line. During the interval ($\tau$412), during which the charging voltage signal (Sw1) is higher than this, the gate driver signal (Sg) reaches a high level, as is shown in FIG. 12i.

As a result of the input of the gate driver signal (Sg) which was output by the gate driver signal generating circuit (Upm) into the gate driver circuit (Gx), a feedback control system is completed in which the lamp current signal (Si) and the lamp voltage signal (Sv) are fedback with operation of the switching device (Qx).

As was described above, the above described signal (Sf') is formed by a residual offset being added to the error integration signal (Sf). The pulse duty factor of the gate driver signal (Sg) is therefore less than or equal to a certain maximum value which is less than 100%, i.e., less than or equal to the maximum pulse duty factor Dxmax, even if it assumed that the error integration signal (Sf) is 0.

The amount of added residual offset can be changed by increasing or decreasing the number of diodes (Dw1, Dw2), by replacement with a Zener diode with a suitable Zener voltage, or by similar methods.

Figure 11:
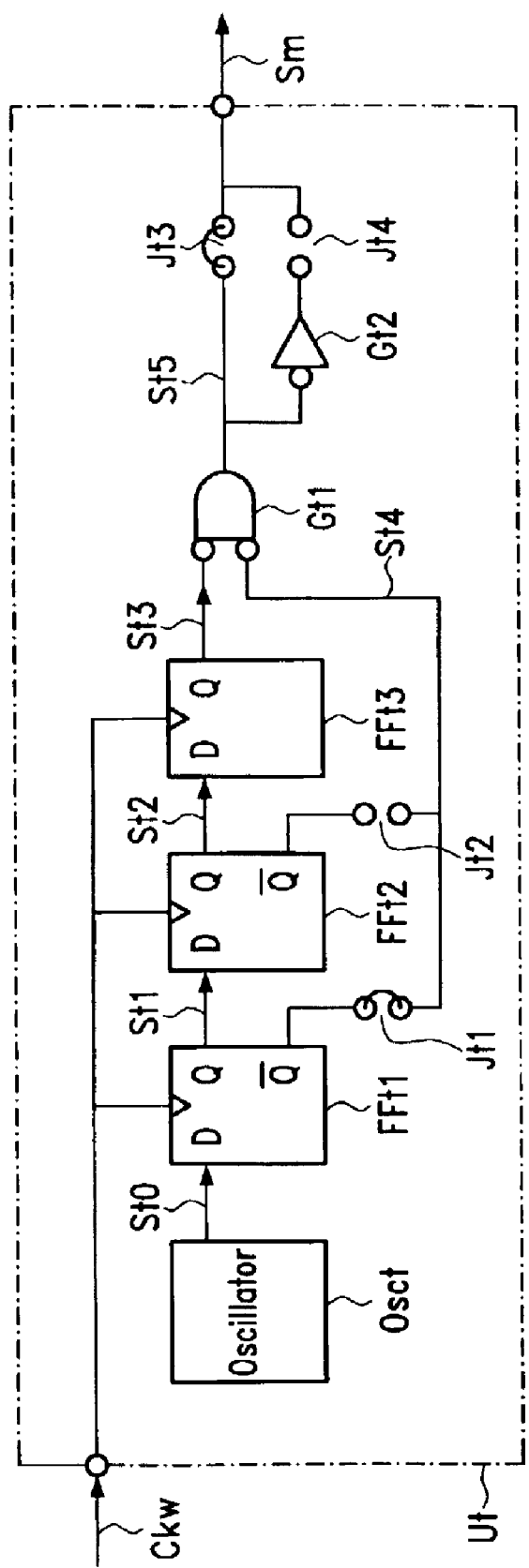
FIG. 11 shows a schematic of one example of the arrangement of a phase modulation control circuit for a chopper of the feed device of the light source device in accordance with the invention.

FIG. 11 schematically shows one example of the arrangement of the phase modulation control circuit (Ut) in a simplified representation. Here, an oscillator (Osct) produces a signal (St0) for fixing the period with which phase modulation is added to the gate modulation circuit (Uw) (FIG. 12d).

This signal is converted into a signal (St1) which has been synchronized by a D-flipflop (FFt1) (FIG. 12e). Furthermore, in this way, signals (St2, St3) are produced which have been delayed by D-flipflops (FFt2, FFt3) (FIG. 12f, FIG. 12g). The clock signal for operation of the D-flipflops (FFt1, FFt2, FFt3) is the timing pulse (Ckw).

Since the signal (St3) with the greatest time delay and the signal (St4) which is an inverted signal from a signal with a lower time delay than the signal (St3) (in this case, the inverted signal is selected from the signal (St1) by a jumper connection to a jumper terminal (Jt1) as the inverted signal (St4)) are input into a gate (Gt1) with NOR logic, this gate (Gt1) produces a signal (St5) which reaches a high level only by the interval ($\tau$411) of the given period of the timing pulse (Ckw) (in this case, only by two periods of the timing pulse (Ckw)) (FIG. 12h).

The signal (St5) (selected by the jumper connection to the jumper terminal (Jt3)) is sent as the phase modulation signal (Sm) to the gate modulation circuit (Uw). In the gate modulation circuit (Uw), a charging current is supplied from the direct current source (Vcc) via a resistor (Rw4) to the capacitor (Cw1) by the fact that a transistor (Qw2) is shifted via a resistor (Rw3) into the ON state by an inverting circuit which is comprised of resistors (Rw1, Rw2) and a transistor (Qw1) during the interval ($\tau$411) during which the phase modulation signal (Sm) is at a high level.

As was described above, the capacitor (Cw1) is normally charged via the resistor (Rw6). However, since charging also takes place via the resistor (Rw2) during the interval in which the phase modulation signal (Sm) is at a high level, the rise of the waveform of the charging voltage (Sw1) increases during the charging interval, as is shown using interval (τ411) in FIG. 12a. In this way, the period of the gate driver signal (Sg), i.e., the interval with a high level and the interval with a low level, is shortened. As a result, both the ON interval and also the OFF interval of the switching device (Qx) is shortened and phase modulation is accomplished. This state corresponds to FIG. 3d.

Here, the ripple of the lamp current (IL) which is shown schematically using the solid line in FIG. 12j is obtained. Compared to the ripple in the case in which it is assumed that, during the interval (τ411) and afterwards, the phase modulation which is shown using the dot-dash line was not present, the phase is shifted more. This indicates that the disadvantage of acoustic resonance of the lamp is avoided.

The more the resistance (Rw4) of the gate modulation circuit (Uw) in FIG. 10 is reduced, the greater becomes the degree of period shortening of the switching device (Qx) during the interval in which the phase modulation signal (Sm) is at a high level. Therefore, by controlling the value of the resistance (Rw4), the amount of phase shift given during the interval (τ411) can be regulated.

In the phase modulation control circuit (Ut) in FIG. 11, a case is shown in which a jumper is connected to the jumper terminal (Jt1). However, by connecting the jumper to the jumper terminal (Jt2), a change can be accomplished by the ON interval and the OFF interval of the switching device (Qx) being shortened only by the period of the timing pulse (Ckw).

In this way, since the ON interval and the OFF interval of the switching device (Qx) are shortened over the times with the period number of the timing pulse (Ckw), which is identical to the difference between the step numbers of the time delay of the two signals which have been input into the gate (Gt1), by a suitable increase or decrease of the number of D-flipflops, the number of periods of the timing pulse (Ckw) can be controlled for which the ON interval and the OFF interval of the switching device (Qx) are shortened.

Furthermore, in the phase modulation control circuit (Ut) in FIG. 11, a case is shown in which a jumper has been connected to the jumper terminal (Jt3). However, a change can be carried out by phase modulation being accomplished such that, by connecting a jumper to the jumper terminal (Jt4), the phase modulation signal (Sm) is inverted and that, therefore, both the ON interval and also the OFF interval of the switching device (Qx) are prolonged. That state in which both the jumper terminal (Jt4) and also the jumper terminal (Jt2) are used in this way is shown in FIG. 3a.

Figure 13:
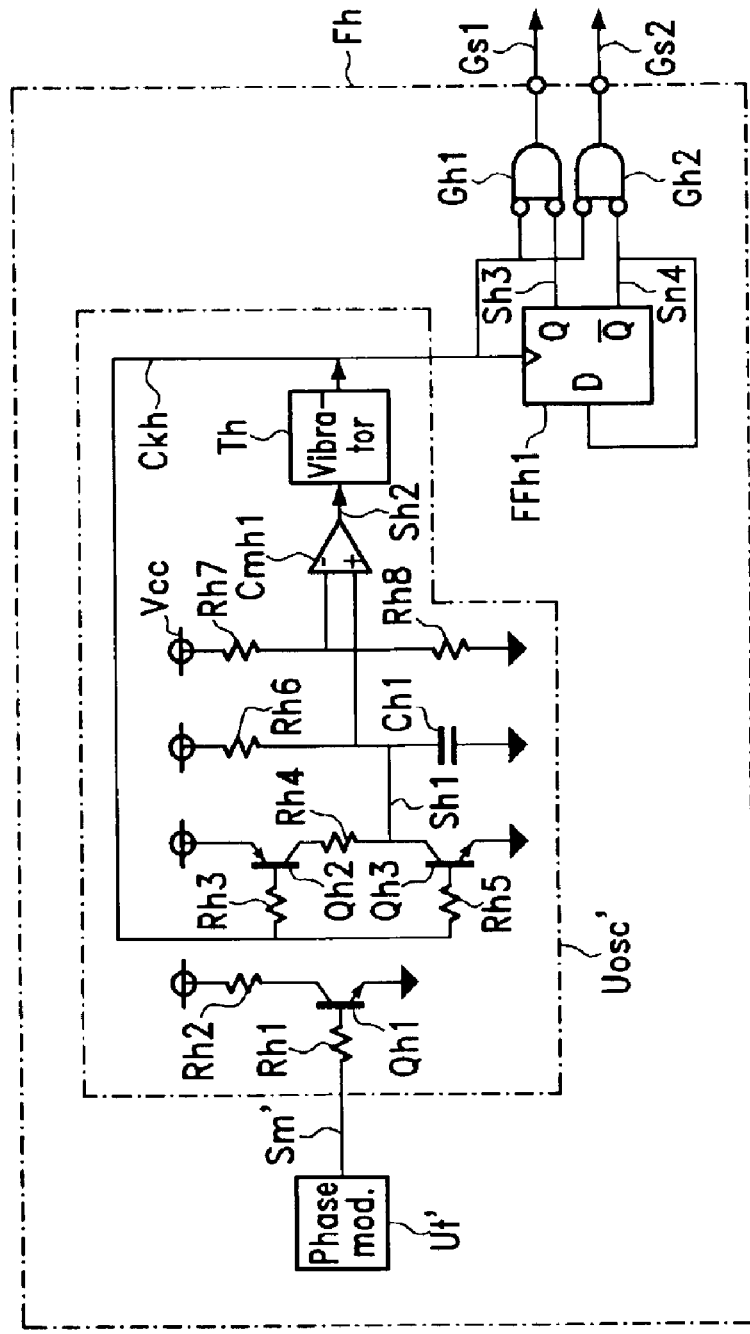
FIG. 13 shows a schematic of an example of the arrangement of the inverter control circuit of the feed device of the light source device in accordance with the invention of the alternating current drive type.

A second embodiment of the invention is described below. FIG. 13 shows one example of the arrangement of the inverter control circuit (Fh) in the light source device of the alternating current drive type of the invention described above using FIG. 6 in a simplified representation.

The oscillation block (Uosc') in FIG. 13 has the same arrangement and the same operation as the oscillation block (Uosc) in FIG. 10. Therefore, the details are not described again. Furthermore, a phase modulation control circuit (Ut') has the same arrangement and the same operation as the phase modulation control circuit (Ut) described in FIG. 11. The details thereof are thus not further described.

Figure 14:
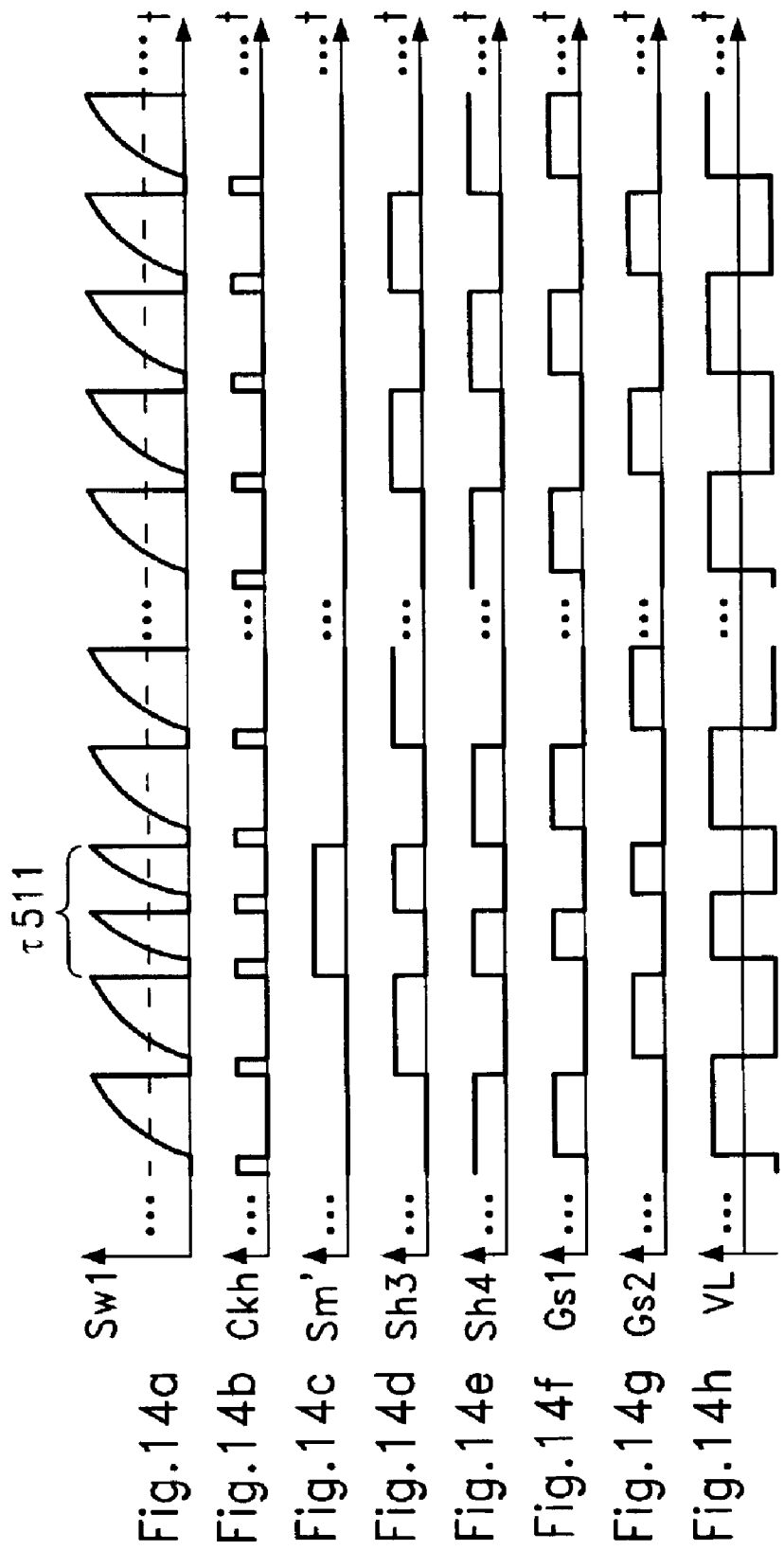
FIGS. 14a to 14h each show a schematic of one example of the operation of the inverter of the feed device of the light source device in accordance with the invention of of alternating current drive type.

The state of the timing pulse (Ckh) which is produced by the charging voltage signal (Sh1) of the capacitor (Cw1) and a monostable multivibrator (Th) within the oscillation block (Uosc'), and the state of a phase modulation signal (Sm') which is produced by the phase modulation control circuit (Ut') are shown in FIGS. 14a, 14b, and 14c.

The timing pulse (Ckh) is supplied as a clock pulse to a D-flipflop (FFh1). Furthermore, then, since inverted signal (Sh4) of the output of the D-flipflop (FFh1) is input as its input signal, the signal (Sh3) which is output by the D-flipflop (FFh1) inverts its output each time the timing pulse (Ckh) starts (FIG. 14d, FIG. 14e).

On the other hand, the timing pulse (Ckh) and the signal (Sh3) from the D-flipflop (FFh1) are input into the gate (Gh1) with a NOR logic. Furthermore, the timing pulse (Ckh) and the inverted signal (Sh4) of the D-flipflop (FFh1) are input into the gate (Gh2) with a NOR logic. The signal (Gs1) which is output by the gate (Gh1) and the signal (Gs2) which is output by the gate (Gh2) are therefore at a low level and alternately at a high level, as is shown in FIG. 14f and FIG. 14g, during the interval during which the timing pulse (Ckh) is at a high level.

By controlling the gate driver circuits (G1, G4) which control the switching devices (Q1, Q4) of the inverter (Ub) of the full bridge type, using the signal (Gs1) and by controlling the gate driver circuits (G2, G3) which control the switching devices (Q2, Q3) using the signal (Gs2), the inverter (Ub) of the full bridge type can be driven (FIG. 14h).

When the phase modulation signal (Sm') from the phase modulation control circuit (Ut') reaches a high level, during the interval (τ511) during which the phase modulation signal (Sm') is at a high level, by the same operation as the operation which was described above with respect to the gate modulation circuit (Uw) and the phase modulation control circuit (Ut), the periods of the signal (Sh3) from the D-flipflop (FFh1) and of its inverted signal (Sh4) are shortened. The periods of the signal (Gs1) and of the signal (Gs2) are therefore shortened. Therefore, as was described above, a suitable amount of phase shift can be imparted to the periodic inverting operation of the inverter. This indicates that, as a result, the function of avoiding the disadvantage of acoustic resonance of the lamp is developed.

For the arrangements of the chopper capacity control circuit (Ud) described above with reference to FIG. 9, the gate modulation circuit (Uw) described above using FIG. 10, and the inverter control circuit (Fh) described using FIG. 13, a commercially available, integrated circuit can be used in which parts are integrated which correspond to the operational amplifier (Ade), part of the oscillation block (Uosc, Uosc'), the comparator (Cmw2), the flipflop (FFh1) and the gates (Gh1, Gh2) (for example, TL494 from Texas Instruments, μPC494 from Nihon Denki A. G. or the like).

Figure 15:
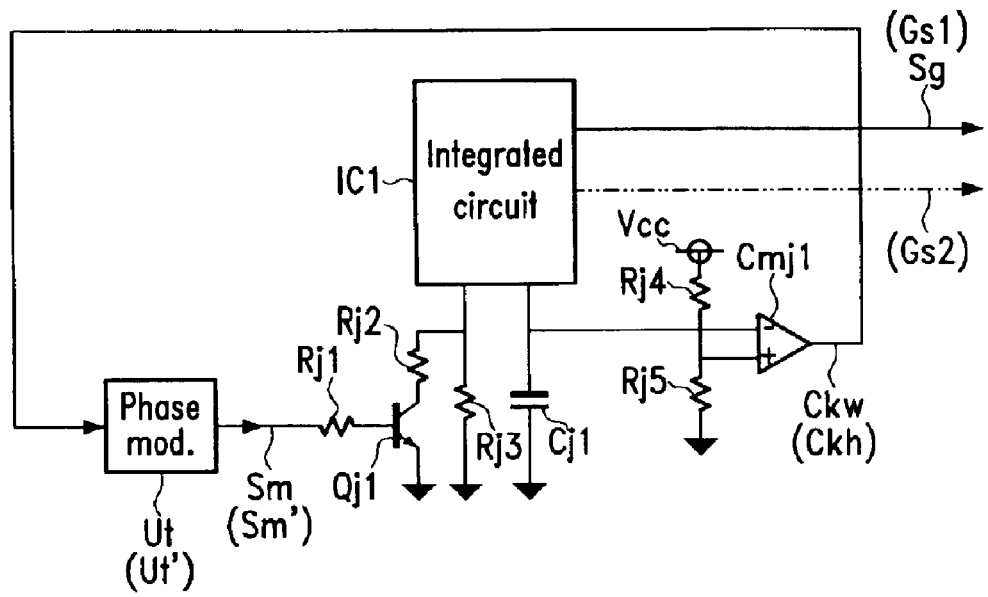
FIG. 15 shows a schematic of one example of the arrangement of part of a chopper capacity control circuit and a gate driver signal generation circuit of the feed device of the light source device in accordance with the invention or of the inverter control circuit of the feed device of the light source device in accordance with the invention of the alternating current drive type.

FIG. 15 shows one example of the arrangement in the case in which using TL494 as the integrated circuit (IC1), there are one part of the chopper capacity control circuit (Ud) and the gate driver signal generation circuit (Upm) and in which the gate driver signal (Sg) for chopper driving is produced, in a simplified representation.

By connecting a resistor (Rj3) to the terminal for connecting an oscillation frequency determination resistor of the integrated circuit (IC1), by connecting a capacitor (Cj1) to the terminal for connecting an oscillation frequency determination capacitor of the integrated circuit (IC1), and by operating the integrated circuit (IC1), a signal with the same sawtooth wave as in FIG. 12a is formed in the capacitor (Cj1). Therefore, by producing a suitable threshold value voltage by the voltage divider resistors (Rj4, Rj5) and by comparison of this to the voltage of the capacitor (Cj1) using a comparator (Cmj1), the same timing pulse (Ckw) as in FIG. 12c can be produced.

Figure 12:
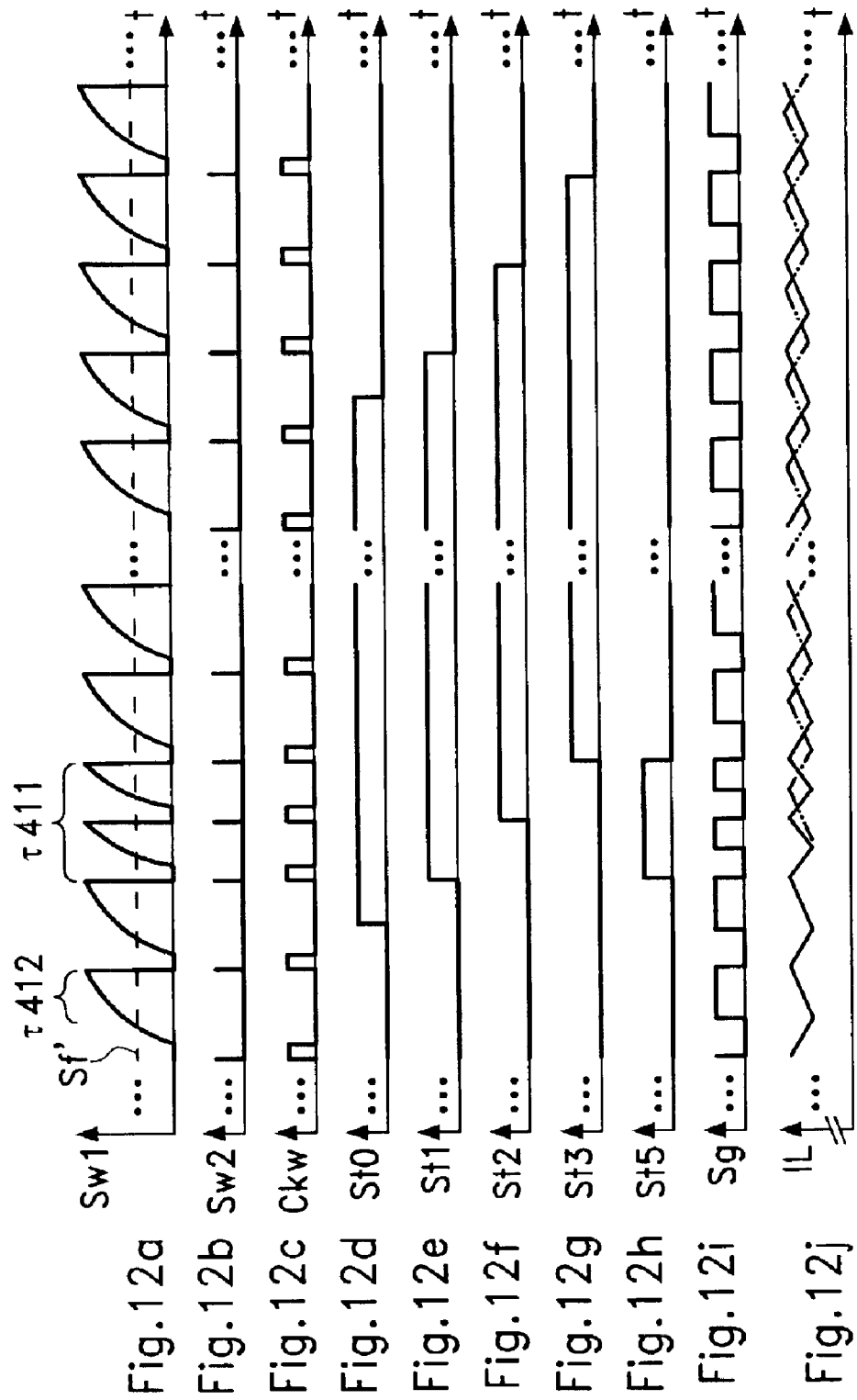
FIGS. 12a to 12j each show a schematic of one example of the operation of a chopper of the feed device of the light source device in accordance with the invention.

By inputting this timing pulse (Ckw) into the phase modulation control circuit (Ut), the same phase modulation signal (Sdm) as in FIG. 12*h* is produced. Since, during the interval during which the phase modulation signal (Sm) is at a high level, a resistor (Rj2) is inserted in parallel to the resistor (Rj3) and a transistor (Qj1) is shifted via a resistor (Rj1) into the ON state, during this interval the oscillation period of the integrated circuit (IC1) is shortened. In this way, the same operation is carried out as during the interval (τ411) shown in FIG. 12. As result, the same gate driver signal (Sg) which has been phase-modulated is produced as in FIG. 12*i*.

In the case in which there is an inverter control circuit (Fh) and in which the signals (Gs1, Gs2) for inverter driving are produced, the circuit described above using FIG. 15 can also be used. The parts which differ in this case are shown in addition in parentheses. By inputting the output of the comparator (Cmj1) as the timing pulse (Ckh) into the phase modulation control circuit (Ut'), the same phase modulation signal (Sm') is produced as in FIG. 14*c*, by which the same signals (Gs1, Gs2) as in FIG. 14*f* and FIG. 14*g* are produced. By operating the inverter (Ub) based on these signals, as a result, the inverter operation which has been phase-modulated and which is shown in FIG. 14*h* can be implemented.

In the circuit shown in FIG. 15, the gate driver signal (Sg) must be operated with a mode which produces a pulse for each period of the oscillation period of the integrated circuit (IC1), and the signals (Gs1, GS2), on the other hand, must be operated with a mode which produces a pulse alternating once every two periods of the oscillation period of the integrated circuit (IC1). The integrated circuit (IC1) is therefore set by selecting the target mode from these two modes.

The oscillation frequency of the integrated circuit (IC1) in the case of using the circuit shown in FIG. 15 for chopper operation differs, of course, from the case of using the circuit shown in FIG. 15 for driving the inverter. Therefore, it is necessary to match the value of the capacitor (Cj1) to the respective frequency.

Figure 16:
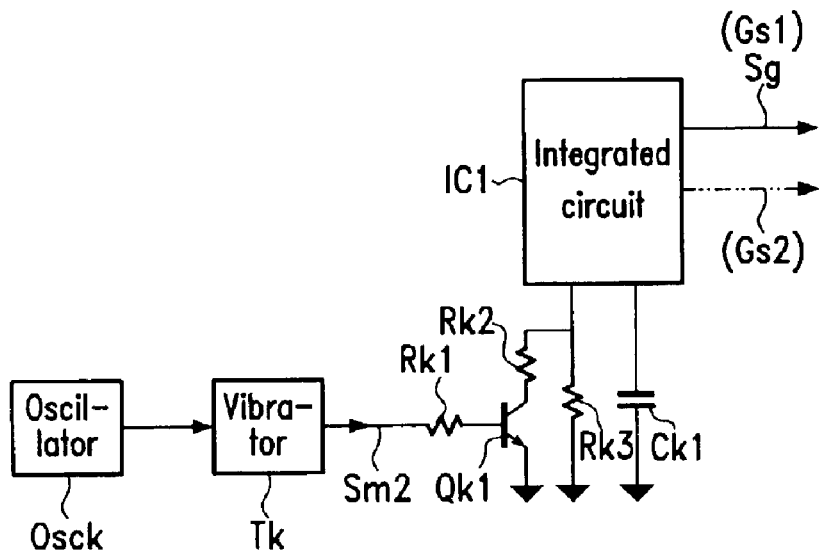
FIG. 16 shows a schematic of another example of the arrangement of part of a chopper capacity control circuit and a gate driver signal generation circuit of the feed device of a light source device in accordance with the invention or of the inverter control circuit of the feed device of the light source device in accordance with the invention of the alternating current drive type.

A case was described above, the phase modulation signals (Sm, Sm') execute a transition synchronously with the timing pulses (Ckw, Ckh). However, the circuit can also be simplified and a transition can be carried out asynchronously. FIG. 16 shows in a simplified representation one example of the arrangement in the case in which likewise using a TL494 component as the integrated circuit, as in the above described case, there are part of the chopper capacity control circuit (Ud) and the gate driver signal generation circuit (Upm) and that the gate driver signal (Sg) for chopper driving is produced.

This circuit differs from the circuit shown in FIG. 15 by the following aspect:

In the circuit shown in FIG. 15, as a result of the voltage signal of the capacitor (Cj1), the timing pulse (Ckw) is produced. In the circuit shown in FIG. 16, this is omitted and a phase modulation signal (Sm2) similar to the phase modulation signal (Sm) with a constant time width is produced by, for example, a monostable multivibrator (Tk) being activated in the starting part of the signal of an oscillator (Osck) for determining the period for carrying out phase modulation to obtain a signal which is similar to the phase modulation signal (Sm), but which is asynchronous.

By this measure, that the phase modulation signal (Sm2) is made asynchronous with respect to the oscillation period of the integrated circuit (IC), the state of phase modulation becomes irreproducible. In the case, for example, of generating a pulse with a low level by the phase modulation signal (Sm2), the cases as shown in FIG. 2*a* and FIG. 2*b* occur mixed with the case as shown in FIG. 3*a*. Even then, the time width of the phase modulation signal (Sm2) is constant. The amount of the displacement of the phase given during this interval is therefore essentially constant. Therefore, the disadvantage of acoustic resonance of the lamp can be effectively avoided by phase modulation if the time width thereof is adjusted in a suitable manner.

Furthermore, in the case in which there is an inverter control circuit (Fh) in entirely the same manner as in the described circuit shown in FIG. 15 and in which the signals (Gs1, GS2) for inverter driving are produced, the circuit shown in FIG. 15 can be used.

Since the invention develops its function, of course, after the start of discharge in a discharge lamp, especially after the start of arc discharge, the invention can be used independently of the arrangements of the starter (Ui, Ui'; see FIGS. 1, 6, respectively) and also independently of the manner in which the high voltage produced by the starter (Ui, Ui') is applied to the discharge lamp.

Therefore, the action of the invention is also advantageously developed in a light source device of the outside trigger type (with the direct current drive method or alternating current drive method) in which, for example, in the discharge space or on the outside of the bulb of the discharge lamp there is an auxiliary electrode and in which between one of the electrodes for the main discharge and the auxiliary electrode a high voltage from the starter is applied.

In these application documents, only what is most necessary for the circuit in order to explain the function and the action of the light source device in accordance with the invention has been described. It is assumed that the other details of the switching operation described in the embodiments, for example, the polarity of the signals, the specific choice, the specific insertion and omission of circuit devices or concepts, such as changes and the like, are intensely carried out based on facilitating the procurement of components and for economic reasons, in the practice of building an actual device.

It is furthermore assumed that especially a device for protecting the circuit devices of a feed device, such as switching devices such as FETs or the like, against damage factors such as a wattage which exceeds a certain value, a current which exceeds a certain value, overheating and the like, or a device which reduces formation of radiating noise and line noise which form according to operation of the circuit devices of the feed device or which prevents the resulting noise from being emitted to the outside, such as, for example, a snubber circuit, a varistor, a clamp diode (including the "pulse-by-pulse" method), a current limiter circuit, a noise filter choke with a "common mode" or a "normal mode", a noise filter capacitor and the like, if necessary, is added to the circuits described in the embodiments.

The arrangement of the light source device in accordance with the invention is not limited to the circuit types described in the embodiments in the application documents nor to the waveforms and representations of the timing which are described in the embodiments. For example, in the phase modulation control circuits (Ut, Ut'), an example was shown in which the oscillator (Osct) for producing the signal (St0) for fixing the period with which phase modulation is produced is located within this light source device. However, it can also be located outside the light source device, for example, on the side of the main part of an optical device within which this light source device is located, such as a projector or the like, the signal (St0) can be produced with timing which is suitable with respect to image processing of the main part of the optical device and it can be delivered to this light source device.

Furthermore, for example, the overall control element (Xpu) of the feed control circuit (Fx) in FIG. 1 subjects the lamp voltage signal (Sv) which corresponds to the lamp voltage (VL) to A/D conversion and on this basis sets the setpoint signal (St) for controlling the chopper capacity. The lamp current signal (Si) which corresponds to the lamp current (IL) is also subjected to A/D conversion, and the setpoint signal (St) for controlling the chopper capacity is changed and adjusted such that the resulting current value agrees with the setpoint current value. In this way, the action of the invention is advantageously developed when the accuracy is increased and in operation such that the effect of scattering of the parameters of the respective circuit device is corrected, or conversely when the arrangement of the light source device becomes diverse, such as a simplification of the arrangement of the light source device such that, for example, the microprocessor unit (Mpu) is saved and instead of it a simpler control circuit is used.

Action of the Invention

In the light source device according to a first aspect of the invention, the disadvantage of acoustic resonance of a discharge lamp which is driven using a direct current or an alternating current is avoided.

In the light source device according to another aspect of the invention, the disadvantage of acoustic resonance of a discharge lamp which is driven using an alternating current is avoided.

What we claim is:

1. Light source device, comprising:

a discharge lamp (Ld) having a pair of opposed electrodes (E1,E2); and a feed device (Ex) connected to the electrodes for starting said discharge lamp and for supplying a discharge current to said electrodes, and including a ballast circuit (Bx), wherein the ballast circuit (Bx) comprises, at a feed control circuit (Fx) detecting a lamp current (IL) and/or a lamp voltage (VL).

a switching device (Qx), a gate driver signal generation circuit (Upm), and a gate drive circuit (Gx)

wherein an output (St) of said feed control circuit (Fx) being provided such that that the switching device (Qx) is controlled through the gate driver signal generation circuit (Upm) and the gate driver circuit (Gx), and wherein the output (St) of said feed control circuit (Fx) undergoes a PWM-modulation via a gate modulation circuit (Uw) of the gate driver signal generation circuit (Upm), and produces a gate driver signal (Sg) at the same time by receiving a phase modulation signal (Sm) of a phase modulation control circuit (Ut).

2. Feed device (Ex) for starting a discharge lump (Ld) and for supplying a discharge current comprising:

a ballast circuit (Bx), wherein the ballast circuit (Bx) comprises, at a feed control circuit (Fx) detecting a lamp current (IL) and/or a lamp voltage (VL), a switching device (Qx), a gate driver signal generation circuit (Upm), and a gate drive circuit (Gx)

wherein an output (Sf) of said feed control circuit (Fx) being provided such that that the switching device (Qx) is controlled through the gate driver signal generation circuit (Upm) and the gate driver circuit (Gx), and wherein the output (Sf) of said feed control circuit (Fx) undergoes a PWM-modulation via a gate modulation circuit (Uw) of the gate driver signal generation circuit (Upm), and produces a gate driver signal (Sg) at the same time by receiving a phase modulation signal (Sm) of a phase modulation control circuit (Ut).

* * * * *